July 18, 1944.     F. NICOLETTI     2,354,044
SPRING VEHICLE WHEEL TIRE
Filed April 6, 1944     2 Sheets-Sheet 1
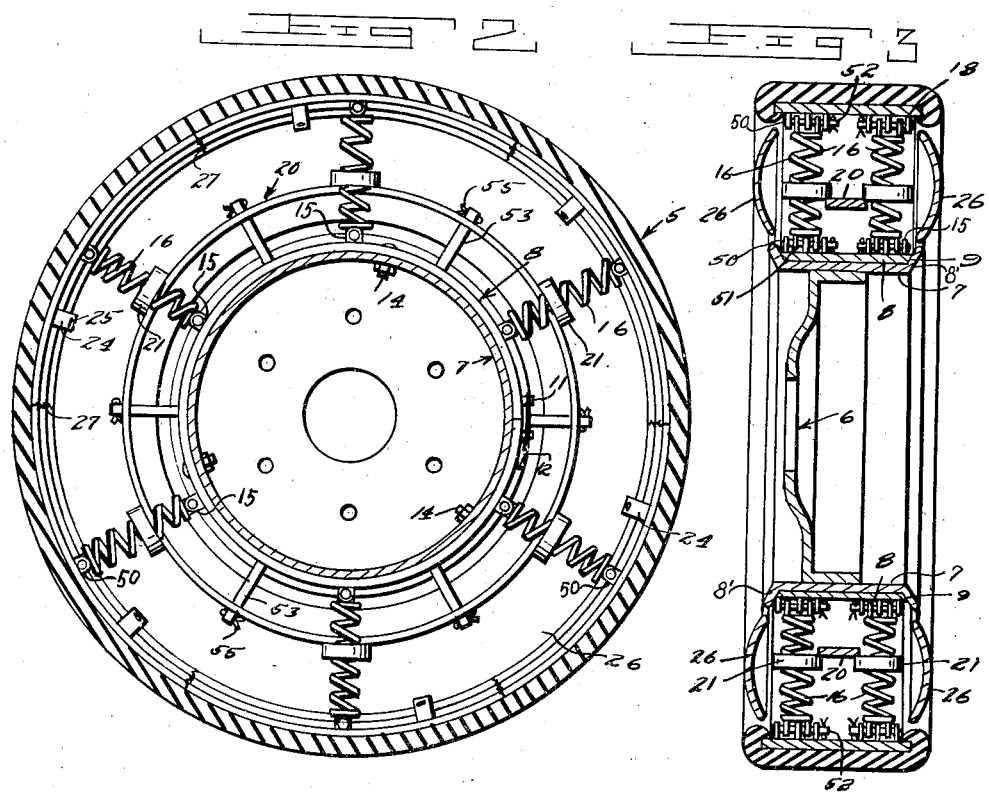
Inventor
Frank Nicoletti
By Clarence A. O'Brien
and Harvey B. Jacobson
Attorneys July 18, 1944.   F. NICOLETTI   2,354,044
SPRING VEHICLE WHEEL TIRE
Filed April 6, 1944   2 Sheets-Sheet 2
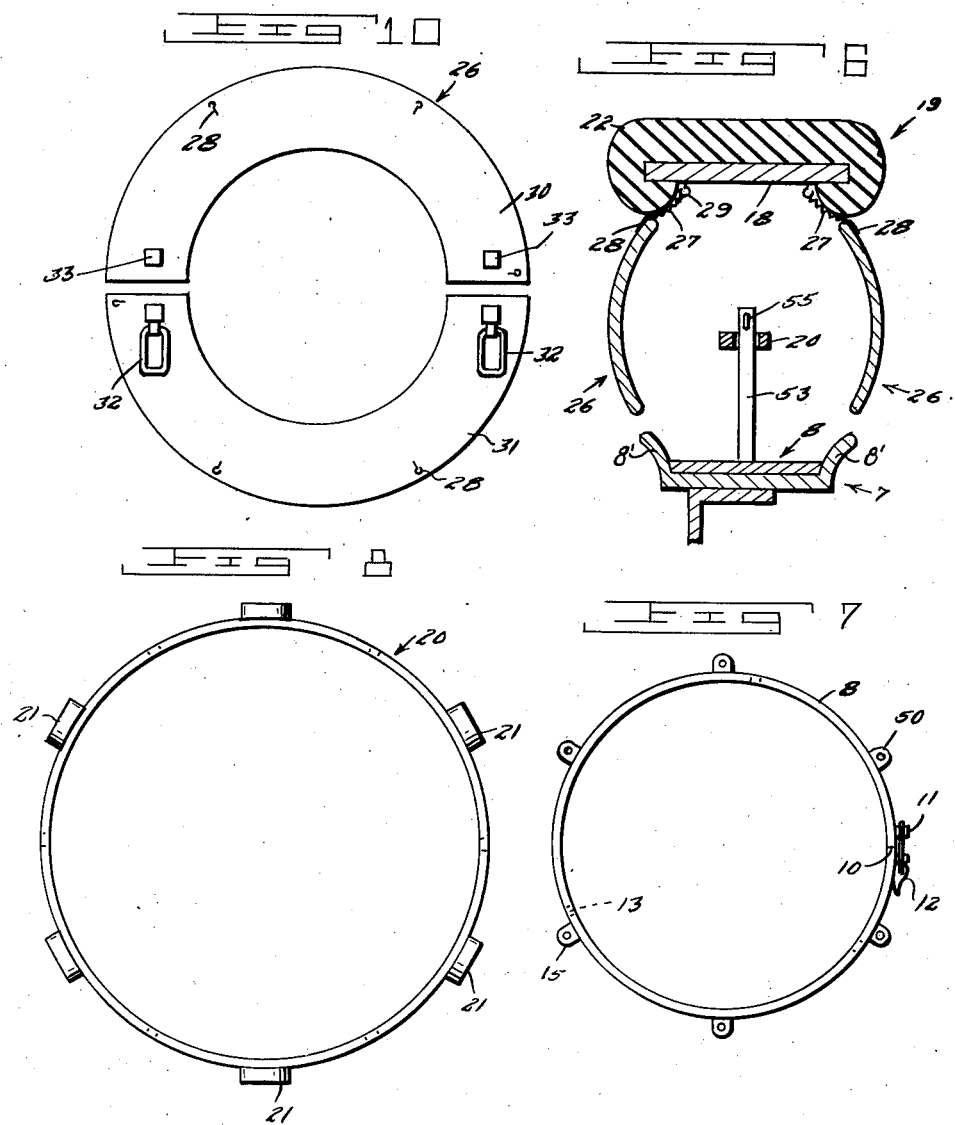
Inventor
Frank Nicoletti
By Clarence A. O'Brien
and Harvey B. Jacobson
Attorneys Patented July 18, 1944

2,354,044

UNITED STATES PATENT OFFICE 2,354,044

SPRING VEHICLE WHEEL TIRE

Frank Nicoletti, Pittsburgh, Pa.

Application April 6, 1944, Serial No. 529,780

4 Claims. (Cl. 152—98)

This invention appertains to new and useful improvements in resilient wheels and more particularly to a spring type wheel.

An important object of the present invention is to provide a spring type wheel wherein the springs are enclosed and always protected against the collection of foreign matter which would in time tend to diminish their efficiency.

Other objects and advantages of the invention will appear to the reader of the following description.

In the drawings:

Figure 1 is a side elevational view of the improved wheel.

Figure 2 is a vertical sectional view through the improved wheel.

Figure 3 is a vertical transverse sectional view.

Figure 4 is a cross sectional view through the tire portion of the wheel.

Figure 5 is a fragmentary inside elevational view of the tire portion of the wheel.

Figure 6 is a transverse fragmentary vertical sectional view showing the means for tying the springs in place.

Figure 7 is a side elevational view of the lug equipped band.

Figure 8 is a side elevational view of the spring eye carrying band.

Figure 9 is a fragmentary elevational view of the band shown in Figure 8.

Figure 10 is a side elevational view of the side guards for the wheel.

Referring to the drawings wherein like numerals designate like parts, it can be seen that numeral 5 generally designates the improved spring tire which is adapted for mounting on a conventional form of vehicle wheel 6 such as is employed on automobiles and which involves a channel rim 7, the improved tire involving a clamp ring 8 in the form of a flat circular band having its side edges beveled as indicated by the numeral 9 to conformably fit the flanges 8 on the automobile wheel rim, the said ring 8 being split at the point indicated by the numeral 10 where it is provided with a keeper 11 on one side of the gap and a swingable latch 12 on the opposite side of the gap, these elements being adapted to be engaged with each other as indicated in Figure 7 of the drawings to lock or clamp 8 on the web of the wheel rim 7 between the flanges of the rim. The clamping ring 8 is provided at intervals with bolt holes 13 through which bolts 14 are passed through accommodating openings in the web of the rim 7 to lock the rim 8 against rotation on the rim 7 as indicated in Figure 2 of the drawings.

On the radially outward side of the ring 8 are sets of laterally spaced apertured lugs 15 which may all face in one direction as indicated in Figure 7 of the drawings. These lugs 15 act as anchors for the radially inward ends of helical springs 16 which extend radially with respect to the ring 8 substantially parallel to each other and have their outer ends engaged with sets of lugs 50 similar to lugs 15 on the radially inward side of the flat metal annulus 18 which when at rest is concentrically spaced around and with respect to the ring 8.

Located between the pairs of springs 16 is the spring controlling annulus 20 which is in the form of a flat relatively rigid spring annulus of a width to fit between the springs as indicated in Figure 3 of the drawings. Attached to the outer side of the control annulus 20 adjacent the opposite edges thereof are the spring encircling eyes 21 which are of an inside diameter to enclose the springs 16 without binding them, the diameter and arrangement of the control annulus 20 being such that the eyes 21 normally encircle intermediate portions of the springs 16 as indicated in Figure 3 of the drawings. The annulus 20 has no other support in the arrangement described than the engagement of the eyes 21 with the springs.

The tread supporting annulus or ring 18 has imposed on the outer side thereof and around the edges thereof an annulus 22 of compressible rubber or other suitable cushion material, which may be formed of portions of old or used tires, with the terminal edges 23 wrapped around and under the ring 18 as indicated in Figures 4 and 6, with lugs 24 circumferentially spaced around the ring 18 along the opposite edges of the inner side thereof penetrating and passing through the portions 23 of the tread and being provided with cotter pins or the like 25 at points radially inwardly from the portions 23, to maintain the portions 23 on the lugs 24 as indicated in Figures 4 and 5 of the drawings. To remove the compressible tread 22 it is then only necessary to remove the cotter keys or pins 25 and slip the portions 23 of the tread off of the lugs 24.

To cover the opposite sides of the tire to improve the appearance thereof by hiding the springs and the mechanism described, and to prevent excessive subjection of the parts to weathering and damage due to striking objects, the tire is provided on each side with a concavo-convex cross section tire wall 26, of a width to substantially reach between the radially inward extremities of the tread assembly 19 and the flanges on the wheel rim 7, as indicated in Figures 3 and 6 of the drawings. These side walls 26 are flexibly assembled on the tire by means of small springs 27 which are stretched between small lugs 28 on the outer edges of the side walls 26 and have their opposite ends connected to small eyes or hooks 29 on the inner side of the metal tread annulus 18 as indicated in Figure 6 of the drawings. This positions the side walls close to the compressible tread terminals 23 and also allows the side walls motion relative to these parts in the action of the wheel. It will be noted that the radially inward extremities of the side walls are more greatly spaced from the flanges on the wheel rim as indicated in Figure 6 of the drawings.

The side walls are formed of semi-circular sections as indicated in Figure 10 by the numerals 30 and 31, these being adapted to be locked in annular relation after assembly by means of swingable latches 32 pivoted on the section 31 and operative relative to detents 33 on the adjacent ends of the section 30.

The apertured lugs 15 and 50 are interlapped by apertured lugs 51 on the opposite ends of the springs 16, and pins 52 equipped with cotter keys serve to inter-connect the band lugs with the lugs on the springs so that the springs are adjustably connected to both the bands and 18. Further, in order to tie the annulus 20 in place, the band 8 is provided with a plurality of outwardly and radially disposed pins 53 which project through openings in the annulus 20 and that these ends are equipped with cotter keys 55. Thus the springs, bands and annulus 20 are all positively tied together in a unitary assembly.

Although there is shown and described herein a preferred embodiment of the invention, it is to be definitely understood that the invention is not limited thereto except as may be required by the scope of the subjoined claims.

Having described the invention, what is claimed as new is:

1. A spring tire for a vehicle wheel having a channel rim comprising a web and side flanges, said spring tire comprising a flat spring clamping ring, said clamping ring being cut at one point to permit opening it to circumpose it on the web and between said side flanges, locking means for contracting the ends of the ring together to constrict the ring on said rim, sets of laterally spaced lugs spaced circumferentially around the radially outward side of said ring, a tread annulus normally circumferentially spaced around said clamping ring, radial helical springs secured to the lugs and radially inward side of said tread annulus, a spring control ring concentrically spaced between said clamping ring and said tread annulus, said spring control ring being positioned between the springs and having lateral eyes encircling the individual springs, and a cushion tread removably secured on said tread annulus.

2. A spring tire according to claim 1 wherein said helical springs are contractile springs.

3. A spring tire according to claim 1 wherein said tread annulus is formed on its radially inward side with circumferentially spaced lugs and wherein said cushion tread comprises an annular compressible body wider than the tread annulus and lying along the radially outward surface of said tread annulus, said body having its lateral edges turned around the edges of said tread annulus and impaled on the lugs, and means to keep the said lateral edges of the cushion tread removably impaled on the lugs.

4. A spring tire according to claim 1 wherein annular side walls extend substantially between said tread and the wheel rim flexible connections supportably connecting the side walls to the tread annulus.

FRANK NICOLETTI.